United States Patent
Glimberg et al.

(10) Patent No.: US 12,038,758 B2
(45) Date of Patent: Jul. 16, 2024

(54) ROBOTIC WORK TOOL SYSTEM AND METHOD FOR TRANSPORTING A ROBOTIC WORK TOOL BETWEEN DIFFERENT AREAS

(71) Applicant: HUSQVARNA AB, Huskvarna (SE)

(72) Inventors: Tommy Glimberg, Nässjö (SE); Stefan Grufman, Bankeryd (SE); Fredrik Kallström, Huskvarna (SE); Mattias Kamfors, Jönköping (SE); Marcus Liljedahl, Huskvarna (SE); Björn Mannefred, Jönköping (SE); Beppe Hellsin, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 154 days.

(21) Appl. No.: 17/765,244

(22) PCT Filed: Sep. 14, 2020

(86) PCT No.: PCT/SE2020/050855
§ 371 (c)(1),
(2) Date: Mar. 30, 2022

(87) PCT Pub. No.: WO2021/066702
PCT Pub. Date: Apr. 8, 2021

(65) Prior Publication Data
US 2022/0342425 A1 Oct. 27, 2022

(30) Foreign Application Priority Data
Sep. 30, 2019 (SE) .................... 1951102-1

(51) Int. Cl.
*G05D 1/00* (2024.01)
*A01D 34/00* (2006.01)

(52) U.S. Cl.
CPC .......... *G05D 1/0265* (2013.01); *A01D 34/008* (2013.01); *G05D 1/0212* (2013.01); *G05D 1/0278* (2013.01)

(58) Field of Classification Search
CPC .. G05D 1/0265; G05D 1/0212; G05D 1/0278; G05D 2201/0208; A01D 34/008
(Continued)

(56) References Cited

U.S. PATENT DOCUMENTS 8,983,693 B2 * 3/2015 Yamamura ........... G05D 1/0225
  701/22
9,063,547 B2 * 6/2015 Yamamura .............. B60L 53/14
(Continued)

FOREIGN PATENT DOCUMENTS

| EP | 2626760 A2 | 8/2013 |
| EP | 2622425 B1 | 6/2018 |
| WO | 2018160114 A1 | 9/2018 |

OTHER PUBLICATIONS

International Search Report and Written Opinion in International patent application No. PCT/SE2020/050855, dated Oct. 28, 2020.
(Continued)

*Primary Examiner* — David Luo
(74) *Attorney, Agent, or Firm* — Burr & Forman LLP

(57) ABSTRACT

A robotic work tool system (200) for avoiding trails from a robotic work tool (100) in a transit zone (300) in which the robotic work tool (100) is allowed to travel from a start point (320) to a goal point (330) along a travel path (310). The system (200) comprises at least one memory (120,220) configured to store information about the transit zone (300), at least one robotic work tool (100) configured to travel along the travel path (310) and at least one controller (110,210) for controlling operation of the robotic work tool (100). The controller (110,210) is configured to receive, from the memory (120,220), information about the transit
(Continued)

zone (300) and generate, based on the transit zone (300), the travel path (310) for the robotic work tool (100) from the start point (320) to the goal point (330). The generated travel path (310) is configured to differ from previously generated travel paths.

19 Claims, 4 Drawing Sheets

(58) Field of Classification Search
USPC .......................................... 318/587, 580, 560
See application file for complete search history.

(56)  References Cited

U.S. PATENT DOCUMENTS

| | | |
|---|---|---|
| 2007/0179690 A1 | 8/2007 | Stewart |
| 2012/0029753 A1 | 2/2012 | Johnson et al. |
| 2013/0030609 A1 | 1/2013 | Jaegenstedt |
| 2013/0184924 A1 | 7/2013 | Jaegenstedt et al. |
| 2018/0116105 A1 | 5/2018 | Balutis et al. |

OTHER PUBLICATIONS

Swedish Search Report in Swedish patent application No. 1951102-1, dated Mar. 16, 2020.

* cited by examiner

ROBOTIC WORK TOOL SYSTEM AND METHOD FOR TRANSPORTING A ROBOTIC WORK TOOL BETWEEN DIFFERENT AREAS

TECHNICAL FIELD

The present disclosure relates to a robotic work tool system as well as a method for an improved way of transporting a robotic work tool between different areas.

BACKGROUND

A robotic work tool is an autonomous robot apparatus that is used to perform certain tasks, for example for cutting lawn grass. A robotic work tool is generally controlled by defining an area, in which the robotic work tool is intended to operate. The work area is defined by a perimeter enclosing the work area. The perimeter includes borders, or boundaries, which the robotic work tool is not intended to cross. The robotic work tool is typically configured to work in a random pattern inside the work area.

When larger areas are to be mowed, these are generally divided into subareas, i.e. smaller defined areas with boundaries. An example of such a large area may be a sports area, which comprises several football fields. In such sports area, the robotic work tool typically has to transport between a charging station and the football fields, or subareas, and between the different football fields. Generally, there is a desired path which the robotic work tool should take in order to avoid obstacles, disturbances of other areas etc. The robotic work tool is typically guided along a travel path between these subareas and charging station. The travel path is thereafter repeatedly used by the robotic work tool for transport between the subareas and the charging station.

However, even if there are many advantages with a specified travel path for transporting the robotic work tool between different locations such that obstacles may be avoided and such that the robotic work tool may operate autonomously, without an operator, the inventors have realized that there may arise problems when such travel path is used by multiple robotic work tools and/or when it is used repeatedly. Thus, there is a need for an improved way of transporting a robotic work tool between different locations.

SUMMARY

The inventors of the various embodiments have realized, after inventive and insightful reasoning, that when a defined travel path between different locations is used repeatedly and/or by multiple robotic work tools, the travel path eventually gets permanent marks, or trails, from the wheels of the robotic work tools. This is usually undesirable as it may destroy the area where the travel path is located. It may be perceived as unattractive, but more importantly, it may make the travel path difficult to travel for the robotic work tools. Thus, there is a need for a solution which allows at least one robotic work tool to travel between different locations repeatedly but which still allows the at least one robotic work tool to travel autonomously, without a manual operator, and which still allows the at least one robotic work tool to avoid obstacles.

In view of the above, it is therefore a general object of the aspects and embodiments described throughout this disclosure to provide a solution for an improved way of transporting at least one robotic work tool between different locations.

This general object has been addressed by the appended independent claims. Advantageous embodiments are defined in the appended dependent claims.

According to a first aspect, there is provided a robotic work tool system for avoiding trails from at least one robotic work tool in a transit zone. The transit zone is an area in which the at least one robotic work tool is allowed to travel from a start point to a goal point along a travel path.

In one exemplary embodiment, the robotic work tool system comprises at least one memory configured to store information about the transit zone and at least one robotic work tool configured to travel along the travel path within the transit zone. The robotic work tool system further comprises at least one controller for controlling operation of the at least one robotic work tool. The at least one controller is configured to receive, from the at least one memory, information about the transit zone; and to generate, based on the determined transit zone, the travel path for the at least one robotic work tool from the start point to the goal point. The generated travel path is configured to differ from previously generated travel paths within the transit zone.

In one embodiment, the robotic work tool system further comprises at least one input device configured to receive transit data associated with the start point and the goal point. The at least one controller is further configured to determine the transit zone based on the transit data received from the at least one input device.

In one embodiment, the at least one input device comprises a user interface configured to receive user input from a user during the user's operation and interaction with said user interface.

In one embodiment, the at least one controller is further configured to determine the transit zone by determining virtual boundaries which define a corridor between the start point and the goal point In one embodiment, the at least one input device comprises a recording device. The recording device is configured to record a transit path of the at least one robotic work tool while the at least one robotic work tool is moved from the start point to the goal point. The at least one controller may be configured to determine the virtual boundaries by expanding the recorded transit path sideway, wherein the transit zone is determined as the area between the recorded transit path and the sideway expanded transit path. Alternatively, the at least one controller may be configured to determine the virtual boundaries by expanding the recorded transit path sideway on both sides of the recorded transit path, wherein the transit zone is determined as the area between the sideways expanded transit paths.

In one embodiment, the transit path is expanded by a distance that is configurable by the at least one input device.

In one embodiment, the recording device is configured to record transit paths of the at least one robotic work tool while the at least one robotic work tool is moved from the start point to the goal point, and from the goal point back to the start point. The at least one controller is configured to determine the transit zone to be the area between the two recorded transit paths.

In one embodiment, the at least one controller is configured to randomly generate the travel path. In another embodiment, the at least one controller is configured to systematically generate the travel path.

In one embodiment, the previously generated travel paths are the travel paths that have been used by the at least one robotic work tool for the last 7 days. In another embodiment, the previously generated travel paths are the 10 previous generated travel paths.

In one embodiment, at least one of the at least one robotic work tool is a robotic lawn mower.

According to a second aspect, there is provided a method implemented by the robotic work tool system according to the first aspect.

In one exemplary implementation, the method is performed by a robotic work tool system for avoiding trails from at least one robotic work tool in a transit zone. The transit zone is an area wherein the at least one robotic work tool is allowed to travel from a start point to a goal point along a travel path. The robotic work tool system comprises at least one memory configured to store information about the transit zone and at least one robotic work tool configured to travel along the travel path within the transit zone. The robotic work tool system further comprises at least one controller for controlling operation of the at least one robotic work tool. The method comprises receiving, from the at least one memory, information about the transit zone, and generating, based on the determined transit zone, the travel path for the at least one robotic work tool from the start point to the goal point. The generated travel path is configured to differ from previously generated travel paths within the transit zone.

Some of the above embodiments eliminate or at least reduce the problems discussed above. By generating a transit zone wherein the at least one robotic work tool may be transported between a start point and a goal point along different travel paths, it may be assured that the same travel path is not used repeatedly. Thereby, it may be possible to avoid that trails are generated. Thus, a robotic work tool system and method are provided that improve the way of transporting a robotic work tool between different areas.

BRIEF DESCRIPTION OF DRAWINGS

These and other aspects, features and advantages will be apparent and elucidated from the following description of various embodiments, reference being made to the accompanying drawings, in which:

FIG. 6 shows a schematic view of a computer-readable medium.

DETAILED DESCRIPTION

The disclosed embodiments will now be described more fully hereinafter with reference to the accompanying drawings, in which certain embodiments of the robotic work tool system are shown. This robotic work tool system may, however, be embodied in many different forms and should not be construed as limited to the embodiments set forth herein; rather, these embodiments are provided by way of example so that this disclosure will be thorough and complete, and will fully convey the scope of the robotic work tool system to those skilled in the art. Like numbers refer to like elements throughout.

In one of its aspects, the disclosure presented herein concerns a robotic work tool system for avoiding trails from at least one robotic work tool in a transit zone. A transit zone is an area in which the at least one robotic work tool is allowed to travel from a start point to a goal point along a travel path. The transit zone is a corridor within which the at least one robotic work tool may take different travel paths in order to reach the goal point when starting at the start point.

The robotic work tool system comprises at least one robotic work tool. The at least one robotic work tool may be realised in many different ways. While the present disclosure will mainly be described in general terms of an autonomous robot designed for mowing grass, it should be understood that the robotic work tool described herein may be implemented into any type of autonomous machine that may travel between different work areas. Examples of such types of autonomous machines include, without limitation, cleaning robotic work tools, polishing work tools, repair work tools, surface-processing work tools (for indoors and/or outdoors), garbage handling work tools, transportation work tools and/or demolition work tools or the like.

Figure 2:
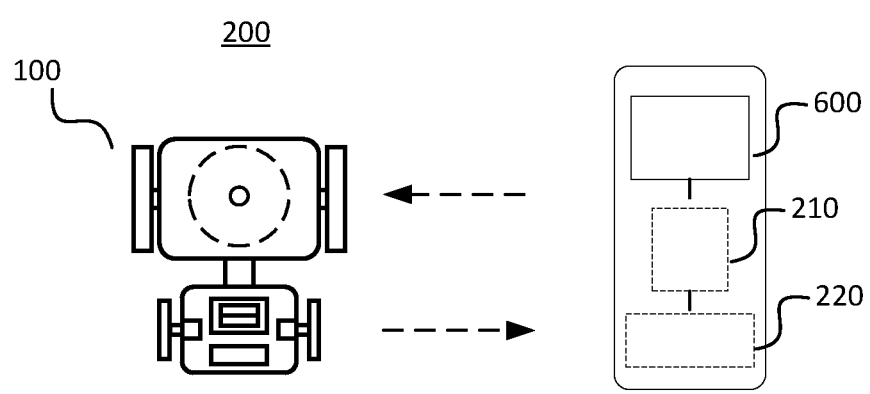
FIG. 2 shows a schematic view of a robotic work tool system.

FIG. 2 shows a schematic overview of a robotic working tool 100, which may be exemplified by a robotic lawnmower 100, having a front carriage 101' and a rear carriage 101". It is appreciated that the present disclosure is not limited to a robotic work tool 100 having separate front and rear carriages 101', 101". Rather, the robotic work tool 100 may also be of a type that comprises one single integral body.

The robotic working tool 100 comprises a plurality of wheels 150. In the exemplary embodiment of FIG. 2, the robotic working tool 100 comprises two pair of wheels 150. One pair of front wheels 150 is arranged in the front carriage 101' and one pair of rear wheels 150 is arranged in the rear carriage 101". However, it may be appreciated that the numbers and locations of the plurality of wheels 150 of the robotic work tool 100 in the present disclosure is not limited to any number and/or location of the plurality of wheels 150. At least some of the wheels 150 are drivably connected to at least one electric motor 155. It is appreciated that combustion engines may alternatively be used, possibly in combination with an electric motor.

With reference to the FIG. 2, a first embodiment according to the first aspect will now be described. FIG. 2 shows a schematic view of a robotic work tool system 200 according to one embodiment. As will be appreciated, the schematic view is not to scale.

As illustrated in FIG. 2, the robotic work tool system 200 comprises at least one robotic work tool 100, at least one controller 110, 210 and at least one memory 120, 220. The at least one robotic work tool 100 is configured to travel along a travel path 310.

Figure 3:
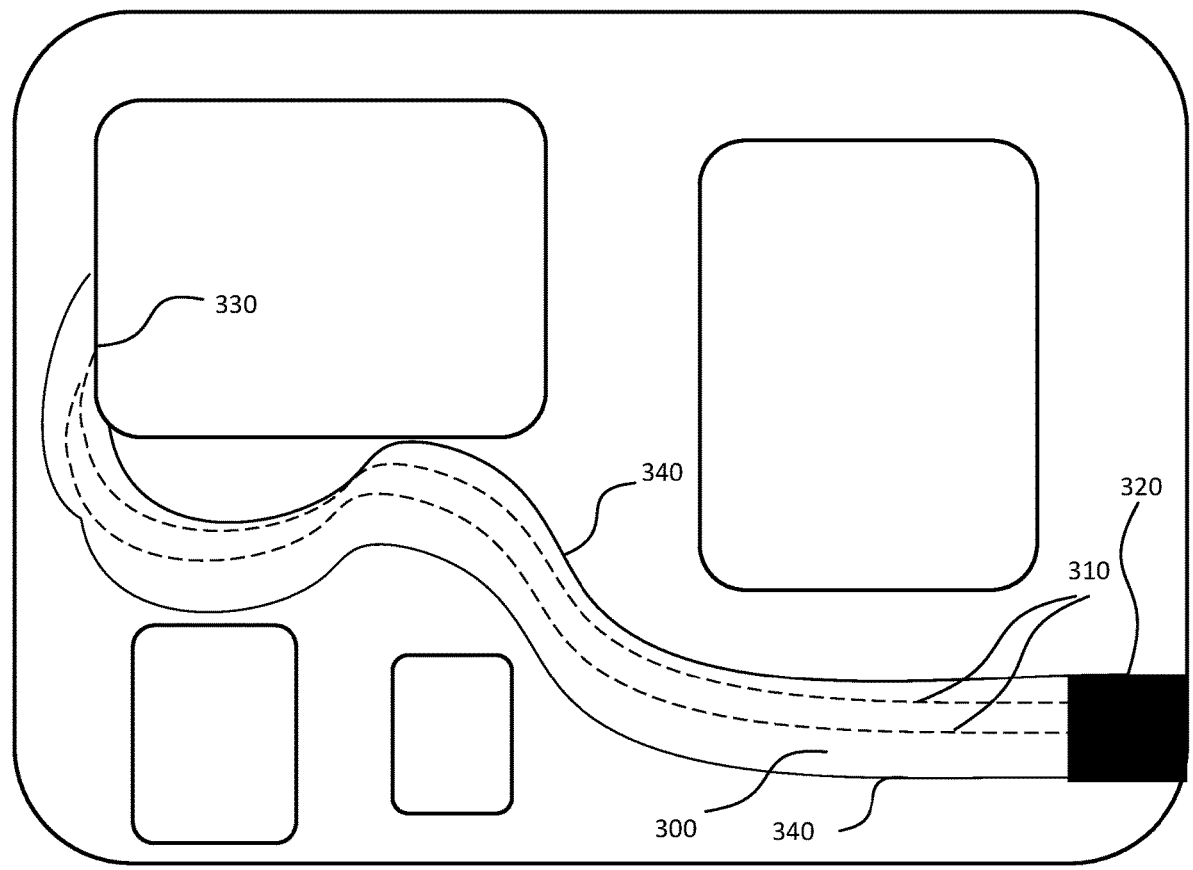
FIG. 3 illustrates an example embodiment.

The at least one memory 120, 220 is configured to store information about the transit zone 300. The transit zone 300 may be exemplified in many different ways, but FIG. 3 illustrates one example of such transit zone 300. The transit zone may be, for example, a zone, or an area, connecting a work area with a charging station located outside the work area, such that the start, or goal, point is located at the border of the work area and the goal, or start, point is located at the charging station. According to another example, the transit zone may be an area connecting a first work area with a second working area, such that the start point is at the border of the first work area and the goal point at the border of the second work area.

As understood from FIG. 2, the at least one memory 120, 220 may be the internal memory 120 of the at least one robotic work tool 100, and/or the at least one memory 120, 220 may be a memory 220 located remote from the at least one robotic work tool 100, e.g. remotely in a cloud-based solution. The at least one memory 120, 220 may be implemented using any commonly known technology for computer-readable memories such as ROM, RAM, SRAM, DRAM, FLASH, DDR, SDRAM or some other memory technology. In embodiments where the robotic work tool system 200 comprises a plurality of robotic work tools 100, it may be appreciated that the at least one memory 120, 220 may be shared between the plurality of robotic work tools 100. In these embodiments, the at least one memory may be a memory 220 located remote from the plurality of robotic work tools 100, e.g. remotely in a cloud-based solution or in a central server. Alternatively, the at least one memory may be the internal memories 120 of the plurality of robotic work tools 100 and shared between the robotic work tools 100.

The at least one controller 110, 210 is configured to control the operation of the at least one robotic work tool 100. The controller 110, 210 is configured to read instructions from the at least one memory 120, 220 and execute these instructions to control the operation of the at least one robotic work tool 100. In one embodiment, the at least one controller 210 is embodied as software, e.g. remotely in a cloud-based solution. In another embodiment, the at least one controller 110, 210 may be embodied as a hardware controller. The at least one controller 110, 210 may be implemented using any suitable, publicly available processor or Programmable Logic Circuit (PLC).

The at least one controller 110, 210 may, for example, be the controller 110 located in the at least one robotic work tool 100. According to another example, the at least one controller 210 may be located in a device that is separate from the robotic work tool 100. When the at least one controller 210 is located in another device than in the at least one robotic work tool 100, the separate device is communicatively coupled to the at least one robotic work tool 100. They may be communicatively coupled to each other by a wireless communication interface. Additionally, or alternatively, the wireless communication interface may be used to communicate with other devices, such as servers, personal computers or smartphones, charging stations, remote controls, other robotic work tools or any remote device, which comprises a wireless communication interface and a controller. Examples of such wireless communication are Bluetooth®, Global System Mobile (GSM) and LTE (Long Term Evolution), 5G New Radio, to name a few.

According to the present disclosure, the at least one controller 110, 210 is configured to receive, from the at least one memory 120, 220, information about the transit zone 300. The at least one controller 110, 210 is further configured to generate, based on the transit zone 300, the travel path 310 for the at least one robotic work tool 100 from the start point 320 to the goal point 330. The generated travel path 310 is configured to differ from previously generated travel paths within the transit zone 300. As understood from e.g. FIG. 3, the travel path 310 is generated based on the transit zone 300 such that it is generated to be located within the transit zone 300. Thus, the transit zone 300 limits where the travel path 310 may be located. However, within the transit zone 300, there are no boundaries and the at least one controller 110, 210 may generate the travel path 310 in any way as long as the travel path 310 is located within the transit zone 300 and the travel path 310 differs from previously generated travel paths 310.

The provided robotic work tool system 200 improves the way of transporting at least one robotic work tool 100 between different areas. By allowing the at least one controller 110, 210 to generate travel paths at any place inside the entire transit zone 300, it may be assured that the at least one robotic work tool 100 does not have to repeatedly be transported along the same travel path to reach the goal point. The provided robotic work tool system 200 may assure that the generated travel path 310 for the at least one robotic work tool 100 is not the same as previously generated and used travel paths. Accordingly, the same travel path is not used repeatedly and thereby, it is avoided that marks, or trails, from the at least one robotic work tool 100 are generated. This may be advantageous as trails usually are undesirable as they may destroy the area where the travel path 310 is located. Trails may be perceived as unattractive, but more importantly, they may make the travel path difficult to travel for the robotic work tools 100. Furthermore, as the at least one robotic work tool 100 is limited to the transport within the transit zone 300, an improved way of transporting the at least one robotic work tool 100 between different locations may also be achieved. The transit zone 300 will assure that the at least one robotic work tool 100 does not travel along any travel path, it may only travel along the generated travel paths 310 within the transit zone 300.

As previously described, the at least one controller 110, 210 is configured to control the operation of the at least one robotic work tool 100. Thus, the at least one controller 110, 210 may control the at least one robotic work tool 100 such that the at least one robotic work tool 100 travels according to the generated travel path 310 when the at least one robotic work tool 100 is going to transport from the start point 320 to the goal point 330. The at least one controller 110, 210 may control the at least one motor 155 of the at least one robotic work tool 100 such that the at least one robotic work tool 100 travels in accordance with the direction of the generated travel path 310.

In one embodiment, the robotic work tool system 200 may further comprise at least one input device 130, 230. The input device 130, 230 may be configured to receive transit data associated with the start point 320 and the goal point 330. The at least one controller 110, 210 may further be configured to determine the transit zone 300 based on the transit data received from the at least one input device 130, 230. Accordingly, the at least one input device 130, 230 may be configured to receive data related to the start point 320 and the goal point 330 and based on this data, the at least one controller 110, 210 may determine the corridor in which the at least one robotic work tool 100 is allowed to travel in order to reach the goal point 330 from the start point 320. The information about the determined transit zone 300 may be stored in the at least one memory 120, 220, and the travel path 310 for the robotic work tool 100, from the start point 320 to the goal point 330, may be generated based on the determined transit zone 300.

The at least one input device 130, 230 may be located in the at least one robotic work tool 100, or the at least one input device 130, 230 may be located in a device that is separate from the at least one robotic work tool 100. When the at least one input device 130, 230 is located in another device than in the at least one robotic work tool 100, the separate device is communicatively coupled to the at least one robotic work tool 100 by a wireless communication interface arranged with the robotic work tool 100.

Accordingly, by including at least one input device 130, 230 in the robotic work tool system 200, it may be possible to influence the transit zone 300. It may be possible to determine the transit zone 300 based on additional data received from the at least one input device 130, 230. Thus, a more precise transit zone 300 may be provided as additional data may be considered when determining the transit zone 300.

In some embodiments, the at least one input device 130, 230 may comprise a user interface 600 configured to receive user input from a user during the user's operation and interaction with said user interface 600. The user interface 600 may be configured to receive input related to, and associated with, the transit zone 300. The user interface 600 may be, for example, a touch user interface. The user interface 600 is preferably separated from the robotic work tool 100 as illustrated in FIG. 3. However, in some embodiments, the user interface 600 may be located at the at least one robotic work tool 100.

By providing a user interface 600 that may receive transit data, a more precise transit zone 300 may be achieved. For example, in some embodiments, the user, or operator, may input transit data that reflect certain requirements desired by the operator and may thereby the influence the transit zone 300. Thus, a flexible way of providing a more accurate transit zone 300 may be achieved. Furthermore, by providing a user interface 600 a more flexible robotic work tool system 200 may be achieved as the operator may input transit data.

In some embodiments, the at least one controller 110, 210 may further be configured to determine the transit zone 300 by determining virtual boundaries 340 which define a corridor between the start point 320 and the goal point 330. By determining the virtual boundaries 340 of the transit zone 300 in which the at least one robotic work tool 100 is allowed to travel between different locations, it may also be assured that hindrance and obstacles are avoided. For example, if a goal point 330 is difficult to access, e.g. because it may be located behind a flowerbed, the transit zone may assure that the at least one robotic work tool 100 is not allowed to pass over the flowerbed. This may be achieved by determining the transit zone 300 such that it is guided around the flowerbed. Accordingly, the proposed robotic work tool system 200 provides an improved way of transporting at least one robotic work tool 100 between different locations.

In some embodiments, the at least one input device 130, 230 may comprise a recording device. The recording device may register a distance and/or a force with which the robotic work tool 100 is moved along a travel route. The recording device may use odometry to estimate the change in position over time. The recording device may, for example, be an encoder. The encoder may be configured to record the travel route of the at least robotic work tool 100 by tracking rotation of the at least one wheel 150. Pulses noted by the encoder may be transformed into distances per time units. By realizing the recording device by an encoder, a relatively simple but accurate input device is provided.

In some embodiments, the recording device may be configured to record a transit path of the at least one robotic work tool 100 while the at least one robotic work tool 100 is moved from the start point 320 to the goal point 330. In some embodiments, the at least one controller 110, 210 may be configured to determine the virtual boundaries 340 by expanding the recorded transit path sideway. The transit zone 300 may then be determined as the area between the recorded transit path and the sideway expanded transit path. In other embodiments, the at least one controller 110,210 may be configured to determine the virtual boundaries 340 by expanding the recorded transit path sideway on both sides of the recorded transit path. Thereafter, the transit zone 300 may be determined as the area between the sideways-expanded transit paths. The transit path may expanded by a distance that is configurable by the at least one input device 600.

Accordingly, by using a recording device to record at least one transit path when the at least one robotic work tool 100 is moved from the start to the goal point and thereafter use this recorded transit path to determine the transit zone 300, it may be easy to assure that the transit zone 300 is located where it is desired. Furthermore, it may be easy to assure that no objects or obstacles are within the way of the at least one robotic work tool 100.

In other embodiments, the recording device may be configured to record transit paths of the at least one robotic work tool 100 while the at least one robotic work tool 100 is moved from the start point 320 to the goal point 330, and from the goal point 330 back to the start point 320. The at least one controller 110,210 may be configured to determine the transit zone 300 to be the area between the two recorded transit paths. Thus, it may be easy to define where the transit zone 300 is located as both boundaries 340 are driven by the at least one robotic work tool 100.

In some embodiments, the at least one controller 110,210 may be configured to randomly generate the travel path 310. Thereby, the risk of the same travel path 310 being generated several times is minimized. In other embodiments, the at least one controller 110, 210 may be configured to systematically generate the travel path 310. In one embodiment, the travel path 310 may generated as a polygonal chain comprising of a connected series of line segments. Each line segment may be generated independently. Each line segment may be generated either randomly or systematically. When they are generated independently, each line segment may be generated such that the generated line segment differ from previously generated corresponding line segments. Furthermore, by generating the travel path 310 as a polygonal chain it may be possible to set different levels of sensitivity for the different line segments. For example, if the first line segment extend over asphalt, that line segment may not be so critical for being used repeatedly, while if the second line segment may extend over grass, that line segment may be really sensitive for repeated use. Thus, the generated travel paths for the first line segment may more often be similar to each other than the generated travel paths for the second line segment.

The travel paths 310 may be pre-generated and assigned to the at least one robot work tool 100 at the moment when it is going to transport between the start point 320 and the goal point 330 in the transit zone 300. Alternatively, the travel paths 310 may be pre-generated and saved within the at least memory 120 within the robotic work tool 100. In case the robotic work tool system 200 comprises multiple robotic work tools 100, each of the at least one robotic work tool 100 may then be assigned different pre-generated travel paths 310.

The previously generated travel paths may, for example, be the travel paths that have been used by the at least one robotic work tool 100 for the last 7 days. Accordingly, within 7 days, the same travel path should not be generated again. Alternatively, the previously generated travel paths 310 may be the 10 previous generated travel paths 310. In this scenario, it is not until the eleventh time that any of the at least one robotic work tools 100 may be transported along the same travel paths 310 within the transit zone 300. In some embodiments, the criteria for previous generated travel paths may be set differently depending on the ground of the transit zone, as also discussed above. For example, a transit zone 300 which comprises grass may be more sensitive to repeatedly used travel paths 310 than a transit zone 300 which comprises of gravel. Thus, the previously generated travel paths 310 may, for example, be the 5 previous generated travel paths 310 for a transit zone 300 of gravel, while it may be the 10 previous generated paths 310 for a transit zone 300 of grass. However, it may be appreciated that the criteria for the previous generated travel paths also may depend on how frequently the transit zone 300 is used.

Figure 4:
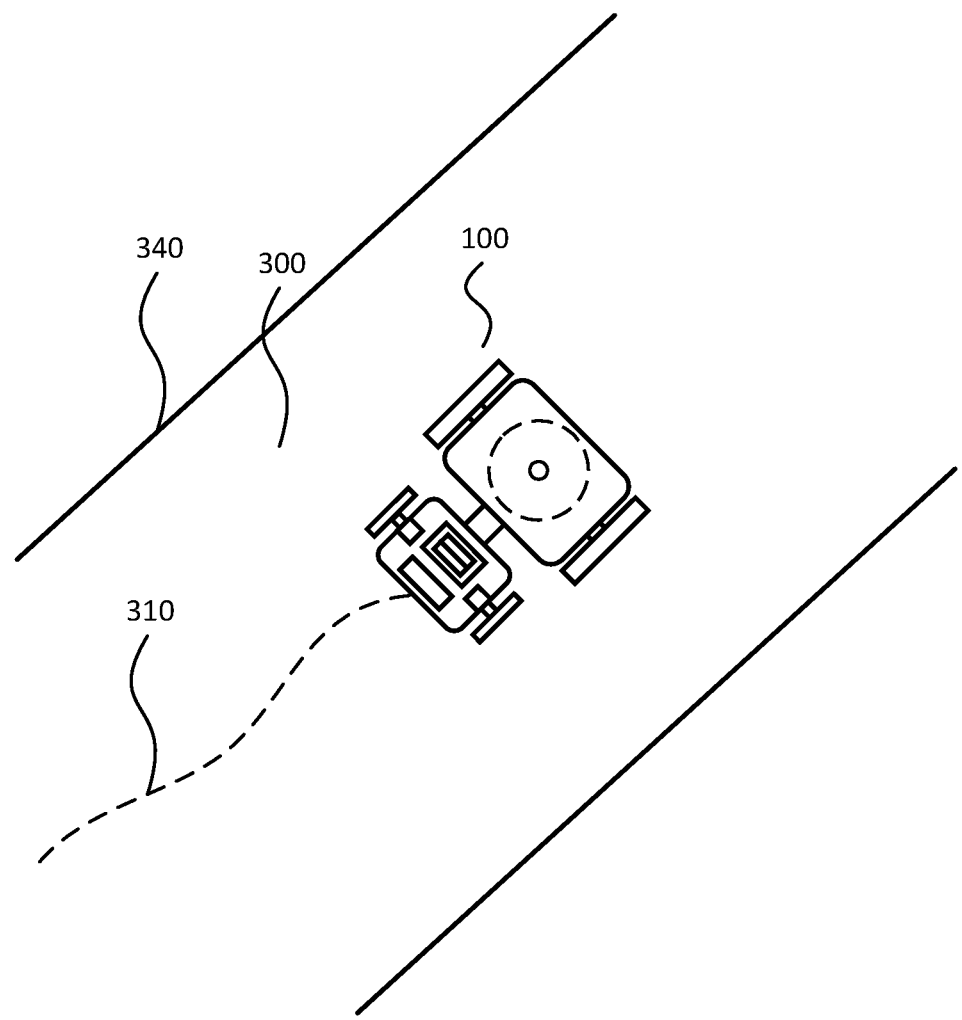
FIG. 4 illustrates an example embodiment implementing the robotic work tool system.

FIG. 4 illustrates an example embodiment implementing the proposed robotic work system 200. The robotic work tool system 200 has received information about a transit zone 300. As previously described, the transit zone 300 is the area in which the at least one robotic work tool 100 is allowed to travel from a start point 320 to a goal point 330 along a travel path 310. The two solid lines 340 beside the robotic work tools 100 in FIG. 4 represents the boundaries of the transit zone 300. The at least one controller 110, 210 will not generate a travel path 310 that crosses these boundaries 340 or a travel path 310 that is located outside this transit zone 300. The dotted line 310 in front of the robotic work tools 100 in FIG. 4 represents the generated travel path 310. As seen in FIG. 4, there are two robotic work tools 100 within the transit zone 300. The number of robotic work tools 100 may also be larger. Alternatively, there may only be one robotic work tool 100. According to this example embodiment, the two robotic work tools 100 are located within the transit zone 300 at approximately the same time. However, it may be appreciated that there may be more than the one robotic work tool 100, but that they may not transport within the transit zone 300 at the same time. Furthermore, it may be appreciated that the travel paths 310 within the transit zone 300 may be directed in different directions. When one of the at least one robotic work tool 100 may be transporting from a start point to a goal point, another robotic work tool 100 may transport in the other direction, i.e. from the first robotic work tool's 100 goal point to its start point. However, regardless of the number of robotic work tools 100 and the directions they are travelling, the at least one robotic work tool 100 travels along different travel paths 310 in order to avoid trails from the wheels 150 of the robotic work tools 100.

As has been described above, when the robotic work tool system 200 comprises a plurality of robotic work tools 100, the plurality of robotic work tools 100 may share the same memory 120, 220. By sharing the memory 120, 220, it may be assured that the generated travel paths 310 are configured to differ also from the previously generated travel paths 310 within the transit zone 300 for the other robotic work tools 100. The plurality of robotic work tools 100 thus have access to the same transit zone 300 and the same history of previously generated travel paths 310. Accordingly, the generated travel paths 310 are configured such that they not only differ from the travel paths 310 generated for a specific robotic work tool 100, but for all robotic work tools 100 comprised in the robotic work tool system 200.

In some embodiments, a central controller 210 generates the travel paths 310 for each robotic work tool 100. In other embodiments, the travel paths 310 for each robotic work tool 100 are generated locally in each robotic work tool 100 by the robotic work tools' local controllers 110. In these embodiments, all the robotic work tools 100 within the robotic work tool system 200 share the same history of generated travel paths 310, i.e. have information of all generated travel paths 310 within the transit zone 300 for all the robotic work tools 100, but the generation of the travel paths 310 is decentralized. When a travel path 310 has been generated within a robotic work tool 100, this information is thereafter stored in the shared memory 120, 220, such that subsequent generation of travel paths 310 may also take this travel path 310 into account when a new travel path 310 is generated.

In some embodiments, when the robotic work tool system 200 comprises a plurality of robotic work tools 100, each generated travel path 310 may be generated for a specific robotic work tool 100. In such embodiments, each generated travel path 310 may be generated with regard to the properties of the specific robotic work tool 100. Example of such properties that may be taken into account when generating the travel path may be, for example, the weight of the robotic work tool 100, the wheels of the robotic work tool 100 and the tools of the robotic work tool 100. In other embodiments, a plurality of travel paths 310 are generated and divided among the plurality of robotic work tools 100 without regard to a specific robotic work tool 100.

In some embodiments, the at least one robotic work tool 100 comprises at least one sensor unit. The at least one sensor unit may detect when the at least one robotic work tool 100 crosses the virtual boundaries 340 of the transit zone 300. Accordingly, the at least one sensor may transmit signals to the at least one controller 110, 210 of the robotic work tool system 200, informing it of that the at least one robotic work tool 100 have entered, or exited, the transit zone 300. The at least one controller 110,210 may thus warn, or inform, an operator of the robotic work tool system 200 about that the at least one robotic work tool 100 has crossed the virtual boundaries of the transit zone 300. The operator of the robotic work tool system 200 may, for example, be informed via the user interface 600 or via a sound signal.

Figure 1:
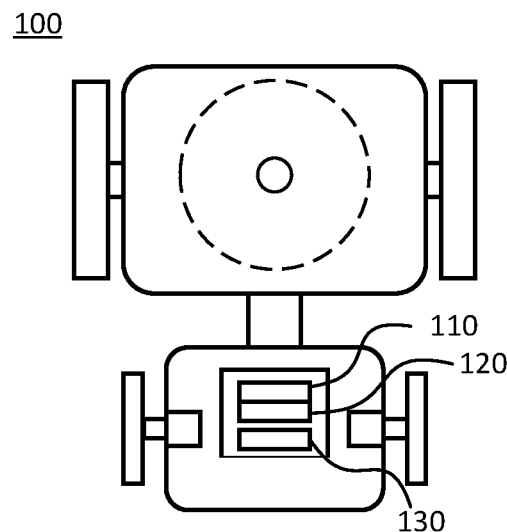
FIG. 1 shows a schematic overview of a robotic work tool.

The at least one sensor unit may, for example, be a position sensor 170. A robotic work tool 100 comprising a position sensor 170 is illustrated in FIG. 1. The position sensor 170 may be configured to detect a position of the robotic work tool 100 when the robotic work tool 100 is moving. The position sensor 170 may comprises a satellite signal receiver 175. The satellite signal receiver 175 may be a Global Navigation Satellite System (GNSS) satellite signal receiver, such as a Global Positioning System (GPS) satellite signal receiver. The position sensor 170 may be connected to the controller 110, 210 for enabling the controller 110, 210 to determine current positions for the robotic work tool 100 using the position sensor 170.

By introducing the above proposed robotic work tool system 200, the previously described disadvantages are eliminated or at least reduced. It may be possible to avoid trails from at least one robotic work tool 100 within a transit zone 300 by guiding the at least one robotic work tool 100 along different travel paths 310 within the transit zone 300 each time the robotic work tool 100 has to transport between the start and goal points. Furthermore, with the proposed robotic work tool system 200, it may be possible to define in which areas a robotic work tool 100 is allowed to travel when transporting between different locations. Accordingly, obstacles and objects on the robotic work tool's 100 way to the goal point 330 may be avoided by defining the transit zone around such obstacles. Thus, a robotic work tool system 200 is provided that improve the way of transporting a robotic work tool between different areas.

Figure 5:
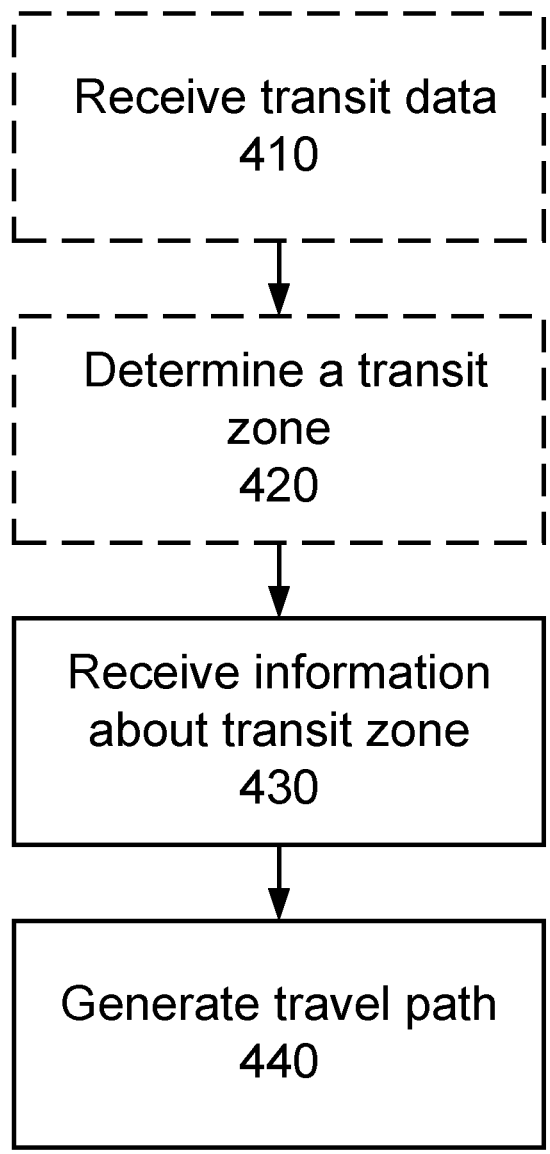
FIG. 5 shows a flowchart of an example method performed by a robotic work tool system.

According to a second aspect, there is provided a method 400 performed by the robotic work tool system 200 according to the first aspect for avoiding trails from at least one robotic work tool 100 in a transit zone 300. The transit zone 300 is an area wherein the at least one robotic work tool 100 is allowed to travel from a start point 320 to a goal point 330 along a travel path. The method 400 will be described with reference to FIG. 5.

In one embodiment, the robotic work tool system 200 comprises at least one memory 120,220 configured to store information about the transit zone 300 and at least one robotic work tool 100 configured to travel along the travel path 310 within the transit zone 300. The robotic work tool system 200 further comprises at least one controller 110, 210 for controlling operation of the at least one robotic work tool 100. The method 400 comprises step 430 of receiving, from the at least one memory 120, 220, information about, or related to, the transit zone 300. Thereafter, the method 400 comprises step 440 of generating, based on the determined transit zone 300, the travel path 310 for the at least one robotic work tool 100 from the start point 310 to the goal point 320. The generated travel path is configured to differ from previously generated travel paths within the transit zone 300.

In some embodiments, the method 400 may further comprise step 410 of receiving transit data. The transit data may be associated with the start point 320 and the goal point 330. The transit data may be received by at least one input device comprised within the robotic work tool system 200. The method may further comprise step 420 of determining the transit zone 300 based on the transit data.

By introducing the above proposed method 400, it may be possible to avoid trails from the at least one robotic work tool 100 within a transit zone 300. The proposed method 400 may provide an improved way of transporting the robotic work tool 100 between different locations.

FIG. 6 shows a schematic view of a computer-readable medium as described in the above. The computer-readable medium 600 is in this embodiment a data disc 600. In one embodiment, the data disc 600 is a magnetic data storage disc. The data disc 600 is configured to carry instructions 610 that when loaded into a controller, such as a processor, execute a method or procedure according to the embodiments disclosed above. The data disc 600 is arranged to be connected to and read by a reading device 620, for loading the instructions into the controller. One such example of a reading device 620 in combination with one (or several) data disc(s) 600 is a hard drive. It should be noted that the computer-readable medium can also be other mediums such as compact discs, digital video discs, flash memories or other memory technologies commonly used. In such an embodiment, the data disc 600 is one type of a tangible computer-readable medium 600.

The instructions 610 may also be downloaded to a computer data reading device 640, such as the controller 110, 210 or other device capable of reading computer coded data on a computer-readable medium, by comprising the instructions 610 in a computer-readable signal 630 which is transmitted via a wireless (or wired) interface (for example via the Internet) to the computer data reading device 640 for loading the instructions 610 into a controller. In such an embodiment, the computer-readable signal 630 is one type of a non-tangible computer-readable medium 600.

The instructions may be stored in a memory (not shown explicitly in FIG. 6, but referenced 120, 220 in FIG. 2) of the computer data reading device 640.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc. Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Still further, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A robotic work tool system for avoiding trails from a robotic work tool in a transit zone, the transit zone being an area in which the robotic work tool is allowed to travel from a start point to a goal point along a travel path, the robotic work tool system comprising:
    at least one memory configured to store information about the transit zone;
    at least one robotic work tool configured to travel along the travel path within the transit zone; and
    at least one controller for controlling operation of the at least one robotic work tool, the at least one controller being configured to:
    receive, from the at least one memory, information about the transit zone; and
    generate, based on the transit zone, the travel path for the at least one robotic work tool from the start point to the goal point, wherein the generated travel path is configured to differ from previously generated travel paths within the transit zone,
    wherein the robotic work tool system further comprises at least one input device configured to receive transit data associated with the start point and the goal point and wherein the at least one controller is further configured to determine the transit zone based on the transit data received from the at least one input device.

2. The robotic work tool system according to claim 1, wherein the at least one input device comprises a user interface configured to receive user input from a user during the user's operation and interaction with said user interface.

3. The robotic work tool system according to claim 1, wherein the at least one controller is further configured to determine the transit zone by determining virtual boundaries which define a corridor between the start point and the goal point.

4. The robotic work tool system according to claim 3, wherein the at least one input device comprises a recording device, wherein the recording device is configured to record a transit path of one of the at least one robotic work tool while the at least one robotic work tool is moved from the start point to the goal point.

5. The robotic work tool system according to claim 4, wherein the at least one controller being configured to determine the virtual boundaries by expanding the recorded transit path sideways to define a sideways expanded transit path, wherein the transit zone is determined as an area between the recorded transit path and the sideways expanded transit path.

6. The robotic work tool system according to claim 4, wherein the at least one controller being configured to determine the virtual boundaries by expanding the recorded transit path sideways on both sides of the recorded transit path to define a sideways expanded transit path, wherein the transit zone is determined as an area between the sideways expanded transit path.

7. The robotic work tool system according to claim 4, wherein the transit path is expanded by a distance that is configurable by the at least one input device.

8. The robotic work tool system according to claim 4, wherein the recording device is configured to record transit paths of the at least one robotic work tool while the at least one robotic work tool is moved from the start point to the goal point defining a first recorded transit path, and from the goal point back to the start point to define a second recorded transit path, and the at least one controller is configured to determine the transit zone to be an area between the first and second recorded transit paths.

9. The robotic work tool system according to claim 1, wherein the at least one controller is configured to randomly generate the travel path.

10. The robotic work tool system according to claim 1, wherein the at least one controller is configured to systematically generate the travel path.

11. The robotic work tool system according to claim 10, wherein a previously generated travel path is a travel path that has been used by the at least one robotic work tool for 7 prior days.

12. The robotic work tool system according to claim 10, wherein a previously generated travel path is one of 10 previous generated travel paths.

13. The robotic work tool system according to claim 1, wherein the at least one robotic work tool is a robotic lawnmower.

14. A method performed by a robotic work tool system for avoiding trails from a robotic work tool in a transit zone, the transit zone being an area wherein the robotic work tool is allowed to travel from a start point to a goal point along a travel path, wherein the robotic work tool system comprises:
- at least one memory configured to store information about the transit zone;
- at least one robotic work tool configured to travel along the travel path within the transit zone; and
- at least one controller for controlling operation of the robotic work tool, the method comprising:
- receiving, from the at least one memory, information about the transit zone;
- generating, based on the transit zone, the travel path for the at least one robotic work tool from the start point to the goal point, wherein the generated travel path is configured to differ from previously generated travel paths within the transit zone,
- wherein the robotic work tool system further comprises at least one input device configured to receive transit data associated with the start point and the goal point and wherein the at least one controller is further configured to determine the transit zone based on the transit data received from the at least one input device.

15. A robotic work tool system for avoiding trails from a robotic work tool in a transit zone, the transit zone being an area in which the robotic work tool is allowed to travel from a start point to a goal point along a travel path, wherein the robotic work tool system comprising:
- at least one memory configured to store information about the transit zone;
- at least one robotic work tool configured to travel along the travel path within the transit zone; and
- at least one controller for controlling operation of the at least one robotic work tool, the at least one controller being configured to:
- receive, from the at least one memory, information about the transit zone; and
- generate, based on the transit zone, the travel path for the at least one robotic work tool from the start point to the goal point, wherein the generated travel path is configured to differ from previously generated travel paths within the transit zone,
- wherein a previously generated travel path is one of a previous number of generated travel paths or is a travel path that has been used by the at least one robotic work tool within a predetermined prior period of time.

16. The robotic work tool system according to claim 15, wherein the predetermined prior period of time is 7 prior days.

17. The robotic work tool system according to claim 15, wherein the previous number of generated travel paths is 10 previous generated travel paths.

18. The robotic work tool system according to claim 15, further comprising at least one input device configured to receive transit data associated with the start point and the goal point; and wherein the at least one controller is further configured to determine the transit zone based on the transit data received from the at least one input device.

19. The robotic work tool system according to claim 18, wherein the at least one input device comprises a user interface configured to receive user input from a user during the user's operation and interaction with said user interface.

* * * * *